(12) United States Patent
Li et al.

(10) Patent No.: US 11,974,265 B2
(45) Date of Patent: Apr. 30, 2024

(54) USE OF PRIORITY MISMATCH INDICATION FOR UPLINK TRANSMISSION FOR WIRELESS NETWORKS

(71) Applicant: NOKIA TECHNOLOGIES OY, Espoo (FI)

(72) Inventors: Zexian Li, Espoo (FI); Matha Deghel, Paris (FR); Sigen Ye, Whitehouse Station, NJ (US); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 232 days.

(21) Appl. No.: 17/301,834

(22) Filed: Apr. 15, 2021

(65) Prior Publication Data
US 2021/0329658 A1 Oct. 21, 2021

(30) Foreign Application Priority Data

Apr. 20, 2020 (WO) ................. PCT/EP2020/060948

(51) Int. Cl.
*H04W 72/12* (2023.01)
*H04L 1/1812* (2023.01)
*H04W 72/1268* (2023.01)
*H04W 72/21* (2023.01)
*H04W 72/23* (2023.01)

(52) U.S. Cl.
CPC .......... *H04W 72/12* (2013.01); *H04L 1/1816* (2013.01); *H04W 72/1268* (2013.01); *H04W 72/21* (2023.01); *H04W 72/23* (2023.01)

(58) Field of Classification Search
CPC . H04W 72/1268; H04W 72/21; H04W 72/23; H04W 72/12; H04L 1/1816
See application file for complete search history.

(56) References Cited

U.S. PATENT DOCUMENTS

| 2020/0367265 | A1* | 11/2020 | Wang | .................... H04W 72/23 |
| 2022/0095324 | A1* | 3/2022 | Huang | ................ H04W 72/566 |
| 2022/0377750 | A1* | 11/2022 | Yin | ..................... H04W 72/569 |

FOREIGN PATENT DOCUMENTS

WO 2020006687 A1 1/2020

OTHER PUBLICATIONS

International Search Report and Written Opinion for International Application No. PCT/EP2020/060948; mailed Dec. 9, 2020; 17 pages.

(Continued)

*Primary Examiner* — Basil Ma
(74) *Attorney, Agent, or Firm* — Robert P. Michal, Esq.; Carter, DeLuca & Farrell LLP

(57) ABSTRACT

According to an example embodiment, a method may include receiving, by a user device in a wireless network, an uplink grant, the uplink grant indicating granted resources having a priority level; determining, by the user device, whether or not information to be transmitted has a priority level that matches the priority level of the granted resources; and transmitting, by the user device, the information via at least a portion of the granted resources, and an indication of whether or not a priority level of the information matches a priority level of the granted resources.

29 Claims, 8 Drawing Sheets

(56) References Cited

OTHER PUBLICATIONS

3GPP TSG-RAN WG2 #104, R2-1817579; "E-mail discussion summary [103bis#41] [NR/IIoT] Intra-UE Prioritization (Nokia)"; Spokane, Washington, USA; Nov. 12-16, 2018; 45 pages.
3GPP TSG-RAN WG2 Meeting #106, R2-1906189; "MAC Behavior for Resource Collision between SR-PUCCH and PUSCH", Reno, Nevada, USA; May 13-17, 2019; 2 pages.
3GPP TSG RAN WG1 #96, R1-1901697; "Enhanced UL grant-free transmission for URLLC", Athens, Greece; Feb. 25-Mar. 1, 2019; 7 pages.
3GPP TSG RAN Meeting #86, RP-193233; "New WID on enhanced Industrial Internet of Things (IoT) and URLLC support", Sitges, Spain; Dec. 9-12, 2019; 5 pages.

\* cited by examiner

US 11,974,265 B2

USE OF PRIORITY MISMATCH INDICATION FOR UPLINK TRANSMISSION FOR WIRELESS NETWORKS

CROSS-REFERENCE TO RELATED APPLICATIONS

This application claims priority to International Application No. PCT/EP2020/060948, filed Apr. 20, 2020, entitled "USE OF PRIORITY MISMATCH INDICATION FOR UPLINK TRANSMISSION FOR WIRELESS NETWORKS", the disclosure of which is hereby incorporated by reference herein in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user device in a wireless network, an uplink grant, the uplink grant indicating granted resources having a priority level; determining, by the user device, whether or not information to be transmitted has a priority level that matches the priority level of the granted resources; and transmitting, by the user device, the information via at least a portion of the granted resources, and an indication of whether or not a priority level of the information matches a priority level of the granted resources.

According to an example embodiment, an apparatus may include means for receiving, by a user device in a wireless network, an uplink grant, the uplink grant indicating granted resources having a priority level; means for determining, by the user device, whether or not information to be transmitted has a priority level that matches the priority level of the granted resources; and means for transmitting, by the user device, the information via at least a portion of the granted resources, and an indication of whether or not a priority level of the information matches a priority level of the granted resources.

According to an example embodiment, a computer program may include instructions which, when the program is executed by a computer, cause the computer to carry out the method of: receiving, by a user device in a wireless network, an uplink grant, the uplink grant indicating granted resources having a priority level; determining, by the user device, whether or not information to be transmitted has a priority level that matches the priority level of the granted resources; and transmitting, by the user device, the information via at least a portion of the granted resources, and an indication of whether or not a priority level of the information matches a priority level of the granted resources.

According to an example embodiment, an apparatus may include: at least one processor; and at least one memory including computer program code; the at least one memory and the computer program code configured to, with the at least one processor, cause the apparatus at least to: receive, by a user device in a wireless network, an uplink grant, the uplink grant indicating granted resources having a priority level; determine, by the user device, whether or not information to be transmitted has a priority level that matches the priority level of the granted resources; and transmit, by the user device, the information via at least a portion of the granted resources, and an indication of whether or not a priority level of the information matches a priority level of the granted resources.

According to an example embodiment, a method may include transmitting, by a network node to a user device in a wireless network, an uplink grant, the uplink grant indicating granted resources having a priority level; receiving, by the network node from the user device, information via at least a portion of the granted resources of the uplink grant and an indication of whether or not a priority level of the information matches the priority level of the granted resources; detecting, by the network node, the indication; and determining, by the network node based on the indication, a network node processing or processing configuration for processing of the received information.

According to an example embodiment, an apparatus may include means for transmitting, by a network node to a user device in a wireless network, an uplink grant, the uplink grant indicating granted resources having a priority level; means for receiving, by the network node from the user device, information via at least a portion of the granted resources of the uplink grant and an indication of whether or not a priority level of the information matches the priority level of the granted resources; means for detecting, by the network node, the indication; and means for determining, by the network node based on the indication, a network node processing or processing configuration for processing of the received information.

According to an example embodiment, a computer program may include instructions which, when the program is executed by a computer, cause the computer to carry out the method of: transmitting, by a network node to a user device in a wireless network, an uplink grant, the uplink grant indicating granted resources having a priority level; receiving, by the network node from the user device, information via at least a portion of the granted resources of the uplink grant and an indication of whether or not a priority level of the information matches the priority level of the granted resources; detecting, by the network node, the indication; and determining, by the network node based on the indication, a network node processing or processing configuration for processing of the received information.

According to an example embodiment, an apparatus may include: at least one processor; and at least one memory including computer program code; the at least one memory and the computer program code configured to, with the at least one processor, cause the apparatus at least to: transmit, by a network node to a user device in a wireless network, an uplink grant, the uplink grant indicating granted resources having a priority level; receive, by the network node from the user device, information via at least a portion of the granted resources of the uplink grant and an indication of whether or not a priority level of the information matches the priority level of the granted resources; detect, by the network node, the indication; and determine, by the network node based on the indication, a network node processing or processing configuration for processing of the received information.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
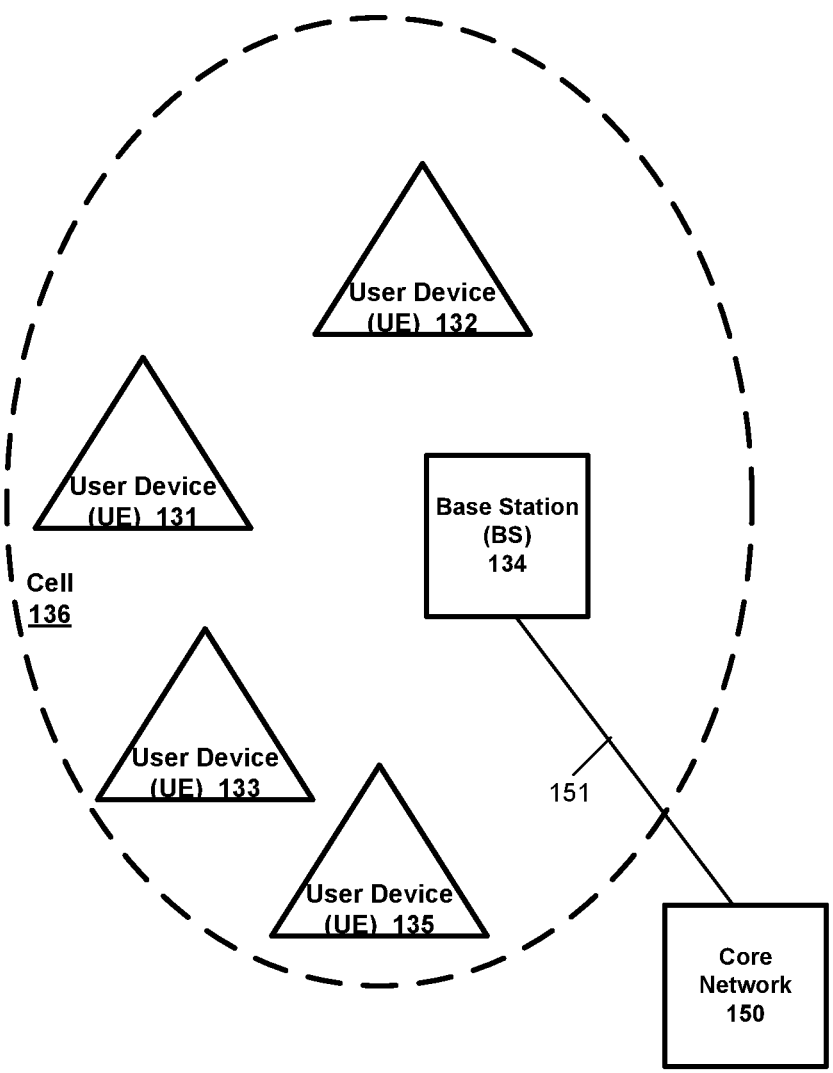
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

A UE may request and obtain uplink resources from a BS (or other network node), by submitting a scheduling request, or a buffer status report, or a request for a configured grant. In an example embodiment, resources may be scheduled by a scheduler (e.g., provided at a network node) based on, e.g., either dynamic scheduling (to provide the UE with a dynamic grant of UL resources), and/or a semi-persistent scheduling (e.g., to provide the UE with a configured grant).

Dynamic scheduling may allow a scheduler (e.g., provided at a network node or BS/gNB) to frequently (e.g., each transmission time interval (TTI) or subframe) grant or allocate resources to a user device (or UE) for an uplink transmission or a downlink reception. Thus, for example, dynamic scheduling may allow a UE to receive grants in every slot, subframe or TTI. Each grant may be provided by a BS or network node to a UE in response to a request. Grants based on dynamic scheduling may be referred to as dynamic grants. Configuration of the DG (dynamic grant) may be provided or communicated to the UE by the network node (e.g., BS or gNB) via downlink control information (DCI) over a physical downlink control channel (PDCCH). The configuration may indicate, for example, an indication of the granted resources (e.g., time-frequency resources) of the DG, and a priority level of the granted resources. For example, a priority level of the granted resources may indicate a high priority level (e.g., for data or service data flows that have a low latency requirement, or other high priority) or a low priority level (e.g., for data or service data flows having a longer or less demanding latency requirement, or a lower quality of service (QoS)). For example, a UE may send a scheduling request for UL resources for a service data flow associated with a logical channel, where the logical channel is associated with a quality of service (QoS), where different QoS may have different priority levels (e.g., which may be based on a QoS criteria, such as (maximum) latency or a maximum packet transmission delay). For example, granted resources provided for a data associated with a QoS with a shorter maximum latency may have a high priority level, while granted resources provided for data associated with a QoS with a longer (less demanding, or less urgent) latency requirement (or a longer maximum transmission latency for a packet) may be assigned with a low priority level, e.g., by the network node.

However, some services may require more frequent or periodic transmission or reception of data. Using a dynamic scheduling for these type of services or applications, for example, may create significant signaling overhead. In an example embodiment, a semi-persistent scheduling (SPS) may also be used in which a BS (or network node) may provide a configured grant for periodic resources for the UE. With configured grant (CG), or grant-free scheduling, the BS informs the UE(s) of the configured grant resources. When a UE initiates a transmission via the CG, the UE uses the resources of the CG without sending a scheduling request and waiting for a grant message from the network node or BS. In an illustrative example, for an uplink transmission, a configured grant (CG) type 1 or type 2 may be used for a configured grant, by way of illustrative example embodiments.

In an example embodiment of a configured grant type 1, an uplink grant is provided or communicated via radio resource control (RRC) signaling/message, including activation of the grant. In type 1 configured grant, by way of illustrative example, the transmission parameters of the configured grant, e.g., which may include periodicity, time offset, frequency resources, time domain allocation and modulation and coding scheme (MCS) for uplink transmissions, may be configured via RRC signaling. For example, upon receiving the RRC configuration of the configured grant, if there is data in the UE transmit buffer, the UE may start to use the configured grant for uplink transmission in the time instant indicated by the periodicity, time offset and time domain allocation.

In an example embodiment of a configured grant type 2, by way of an illustrative example, RRC signaling may be used to configure the periodicity (or period) of the configured grant, while one or more other transmission parameters (e.g., frequency resources and/or MCS) of the configured grant may be provided or configured as part of the activation of the configured grant via layer 1/layer 2 (L1/L2) signaling, such as via downlink control information (DCI) and/or physical downlink control channel (PDCCH). For example, upon receiving the activation command via PDCCH, the UE may transmit according to the configured grant if there is data in the buffer for transmission. For both type 1 and type 2 configured grants, if there is no data in the buffer of the UE for transmission, then the UE does not transmit via the configured grant.

A configuration of the CG may be provided by the network node (e.g., BS or gNB) to the UE via DCI and/or RRC (radio resource control) message. The CG configuration may include, e.g., an indication of the time-frequency resources, a MCS, as well as a priority level of the granted resources.

Therefore, in an example embodiment, for an uplink grant (e.g., either a dynamic grant or a configured grant), the network node (or BS, gNB) may indicate a priority level of the granted resources (e.g., granted time-frequency and/or spatial resources). For example, the network node may provide the configuration of the dynamic grant via downlink control information (DCI) via physical downlink control channel (PDCCH).

Presently, a UE may typically be unable to multiplex (or transmit) information that has a priority level that does not match the priority level of the granted resources. For example, a UE is typically not allowed to transmit high priority level information via low priority level granted resources, nor allowed to transmit low priority level information via a high priority granted resources. Rather, the UE is typically required to drop or postpone the information that has a priority mismatch with the granted resources.

However, according to an example embodiment, a UE may transmit information (e.g., control information and/or data) via granted resources, where the priority level of the information may be different than the priority level of the granted UL resources. The UE may receive (e.g., via DCI or RRC message) a grant of resources (e.g., via DG or CG) for uplink transmission of a physical uplink shared channel (PUSCH) channel, where the UE may transmit data and/or control information via the PUSCH channel. As noted above, the network node (e.g., BS, gNB) may indicate the priority level (along with other aspects of the configuration of the uplink grant) of the granted resources for the grant (e.g., either DG or CG), e.g., via downlink control information (DCI) and/or via a radio resource control (RRC) message sent to the UE. According to an example embodiment, the UE may transmit information (e.g., control information and/or data) via the PUSCH channel, where the information may or may not have the same priority level as the granted resources of the PUSCH channel.

As an illustrative example, a network node (e.g., BS or gNB) may allocate a PUCCH (physical uplink control channel) resource to a UE for sending a scheduling request (SR) (or other uplink control information) to the network node. For example, the UE may be assigned different PUCCH resources for SRs of different priority levels, e.g., such as a first PUCCH resource for a UE to transmit a low priority level SR, and a second PUCCH resource for the UE to transmit a high priority level SR. In an illustrative example, a high priority level SR may be sent by the UE to request resources for a URLLC service data flow, or for other application that may have a strict (or low) maximum latency requirement for data transmission (e.g., very strict maximum packet transmission delay), and a low priority level SR may be sent by the UE for an application that has a longer maximum latency requirement (e.g., for an application that is not as time-sensitive and allows a higher latency or packet transmission delay). The network node may then provide a CG or DG to the UE, including an indication of granted resources and a priority level of the granted resources. Thus, in an illustrative example embodiment, a UE may have low priority level data to be transmitted over a low priority level PUSCH resources, and also may have a high priority level SR to transmit to the network node (e.g., the high priority SR may be for a different service data flow than the low priority data).

Within a TTI, slot or subframe, or at a particular time, in an example embodiment, the UE may perform one transmission, e.g., may transmit via only one of the PUCCH or the PUSCH, but typically cannot transmit via both sets of resources (PUCCH and PUSCH) at the same time (e.g., as the PUCCH resources and the PUSCH granted resources are different frequency resources) on the same serving cell. However, a multiplexing technique may allow the UE to multiplex (or transmit both) of the SR and the data via the granted PUSCH resources. Thus, according to an example embodiment, the UE may transmit both: 1) the low priority level data via a first portion of the granted PUSCH resources, and 2) the high priority level SR (or other high priority control information) via a second portion of the granted PUSCH resources. In this manner, the UE may, for example, multiplex the high priority level control information (e.g., high priority level SR) with the low priority level data over the low priority granted resources, as an illustrative example. The reverse situation may also be performed by the UE, e.g., where a UE may transmit a low priority level information (control information or data) via high priority level granted resources (e.g., where a priority mismatch may exist between the priority level of the information that is transmitted over granted resources, and the priority level of the granted resources). These are some illustrative examples of a mismatch that may arise between a priority level of some information that is transmitted over granted resources, and the priority level of the granted resources. This is just an example, and there may be other example cases where a UE to transmit control information or data via granted resources, where there may be a mismatch in priority levels of the information to be transmitted and the granted resources.

In an example embodiment, processing (e.g., receive processing) by the network node (e.g., BS or gNB) of the received information may increase in complexity and/or require additional resources, and/or other inefficiencies may occur at the network node, if there is a mismatch between the priority level of information received by the network node via granted resources and the priority level of the granted resources. For example, if the network node does not know if a control information (e.g., SR, or other control information) is transmitted via (e.g., multiplexed via) at least a portion of the granted resources, the network node may need to perform decoding of the received information using two different hypotheses, e.g., a first decoding and/or detecting of the information assuming that the SR (or multiplexed control information) is present on the PUSCH, and a second decoding or detecting of the information assuming that the SR (or the multiplexed control information) is not present on the PUSCH, since the format of the received information may be different depending on the presence of the control information. Performing two different decodings or detections of the information, based on different hypotheses (e.g., which may be referred to as the multiple detection hypothesis at the gNB/network node), due to the network node's uncertainty as to whether the (e.g., mismatched priority level) control information or SR is present on the PUSCH, may significantly increase the amount of network node resources (e.g., decoding or detecting resources, and processing and memory resources) that may be required. Furthermore, a mismatch between the priority level of the transmitted information and the priority level of the granted resources used for transmission may cause the network node to allocate or use an incorrect or improper amount of resources for processing of the information and/or to incorrectly prioritize the processing of the information. For example, if the network node receives high priority level control information via low priority level granted resources, the network node may allocate insufficient resources and/or may incorrectly prioritize the processing of such high priority control information, unless the network node is notified of this situation.

Thus, according to an example embodiment, a method may include receiving, by a UE in a wireless network, an uplink grant (e.g., via dynamic grant or configured grant), the uplink grant indicating granted resources (e.g., granted resources for a physical uplink shared channel (PUSCH) channel, or other channel) having a priority level; determining, by the UE, whether or not information to be transmitted has a priority level that matches (e.g., is the same as) the priority level of the granted resources; and transmitting, by the UE, the information via at least a portion of the granted resources, and an indication (e.g., a priority mismatch indication) of whether or not a priority level of the information matches a priority level of the granted resources. For example, the indication (e.g., the priority mismatch indication) may be transmitted via the granted resources (such as a MAC control element, or as part of uplink control information transmitted via the granted resources), or may be a layer 1/layer 2 (L1/L2) signal, such as a reference signal (RS). The L1/L2 signal may be transmitted via part of the granted resources. In an illustrative example, the UE may transmit a high priority level control information via low priority level granted resources. The high priority level control information may be transmitted by itself, or may be multiplexed with other information for transmission via the granted resources. The UE may also transmit the indication (e.g., a priority mismatch indication) that indicates the priority level of the information (e.g., in this case high priority level information) does not match the priority level of the granted resources (e.g., in this example, low priority level granted resources). This may allow the network node to adjust processing of the received information based on the priority mismatch indication, e.g., which may include the network node (e.g., BS or gNB) allocating or using an amount or level of resources, and/or properly prioritizing the processing of the information that is received via the granted resources.

In an example embodiment, the priority mismatch indication, transmitted by the UE, may be one of two (or multiple) different values, including one of the following example values: a first value of the indication to indicate that the priority level of the information matches the priority level of the granted resources; or, a second value of the indication to indicate that the priority level of the information does not match the priority level of the granted resources.

Also, in an example embodiment, the information may include at least one of the following: uplink control information (UCI), including at least one of a scheduling request (SR), a channel state information (CSI), and/or a hybrid ARQ (HARQ) acknowledgement or negative acknowledgement (HARQ ACK/NACK); data; media access control protocol data units (MAC PDUs) that include data; or, MAC control element (MAC CE) including control information.

In an example embodiment, the granted resources may include granted resources having a first priority level; and the information may include either uplink control information or data, having a second priority level that is different from the first priority level, multiplexed onto the granted resources, and wherein the indication indicates that the priority level of the information does not match the priority level of the uplink grant.

In another example embodiment, the uplink grant has a low priority level; and the information may include uplink control information, having a high priority level, multiplexed onto the granted resources with the data having a low priority level, and wherein the indication indicates that a priority level of the uplink control information does not match the priority level of the uplink grant.

In another example embodiment, the uplink grant has a low priority level, and the information may include a scheduling request having a high priority, and wherein the priority mismatch indication indicates that the priority level of the information (e.g., SR) does not match a priority level of the uplink grant, and wherein the indication indicates either a positive scheduling request (which is a presence of a scheduling request) or a negative scheduling request (e.g., no scheduling request is triggered at MAC and being sent by the UE) from the UE.

In another example embodiment, the indication (e.g., priority mismatch indication) may include at least one of: demodulation reference signal (DMRS)-related information; uplink control information; or a media access control (MAC) control element. For example, there may be several different examples of DMRS-related information.

In an example embodiment, the demodulation reference signal (DMRS)-related information may include at least one of: a first DMRS sequence indicating that the priority level of the information matches the priority level of the uplink grant; or a second DMRS sequence indicating that the priority level of the information does not match the priority level of the uplink grant. Thus, different values of the priority mismatch indication may be indicated via use of different DMRS sequences.

In another example embodiment, the DMRS-related information may include at least one of: a DMRS sequence having a first orthogonal cover code (OCC) indicating that the priority level of the information matches the priority level of the uplink grant; or the DMRS sequence having a second orthogonal cover code indicating that the priority level of the information does not match the priority level of the uplink grant. Thus, different values of the priority mismatch indication may be indicated via use of different OCCs for a DMRS sequence.

In another example embodiment, the DMRS-related information may include at least one of: a first set of symbols or time-frequency resources for transmission of a DMRS sequence to indicate that the priority level of the information matches the priority level of the uplink grant; or a second set of symbols or time-frequency resources for transmission of the DMRS sequence to indicate that the priority level of the information does not match the priority level of the uplink grant. Thus, different values of the priority mismatch indication may be indicated via transmission of a DMRS sequence via different resources.

In another example embodiment, the DMRS-related information may include using a different set of antenna ports for the transmission: a first set of antenna ports to indicate that the priority level of the information matches the priority level of the uplink grant; or a second set of antenna ports to indicate that the priority level of the information does not match the priority level of the uplink grant. Thus, different values of the priority mismatch indication may be indicated via DMRS transmission of a different set of used antenna ports.

In another example embodiment, from the perspective of the network node, a method may include transmitting, by a network node to a UE in a wireless network, an uplink grant, the uplink grant indicating granted resources having a priority level; receiving, by the network node from the UE, information via at least a portion of the granted resources of the uplink grant and an indication (e.g., a priority mismatch indication) of whether or not a priority level of the information matches the priority level of the granted resources; detecting, by the network node, the indication (e.g., this may include detecting a value of the priority mismatch indication, which may include detecting either a first value of the indication to indicate that the priority level of the information matches the priority level of the granted resources, or, detecting a second value of the indication to indicate that the priority level of the information does not match the priority level of the granted resources); and determining, by the network node based on the indication, a network node processing or processing configuration for processing of the received information (e.g., which may include adjusting, by the network node based on the indication, processing of the received information performed by the network node).

The determining, by the network node based on the indication, of a network node processing or processing configuration may include a wide variety of processing-related adjustments, selections, and/or changes in network node processing or processing configuration, as (or to be) performed by the network node, based on the indication (e.g., based on the priority mismatch indication). In an illustrative example, the determining, by the network node based on the indication, a network node processing or processing configuration may include, e.g., the network node performing at least one of: selecting, by the network node, an amount and/or type of processor and/or memory resources to be used or applied to process the information; selecting, by the network node, a priority or prioritization that is applied by the network node to process the information; selecting, by the network node, a different set of schemes (at least one) for decoding process; selecting, by the network node, a different scheme, including a different reliability, for any retransmission based (e.g., retransmission based on duplication or redundancy version of an entire block or packet to provide higher reliability for high priority data, or retransmission of only a portion of a block or packet for low priority data) on the information, for example different MCS and transmission power for the retransmission depending on the priority mismatch indication; and/or selecting, by the network node, a different resource allocation scheme (e.g., more proactive resource allocation in case of high priority data), for a first transmission based on the information depending on the received SR is with high or low priority.

Figure 2A:
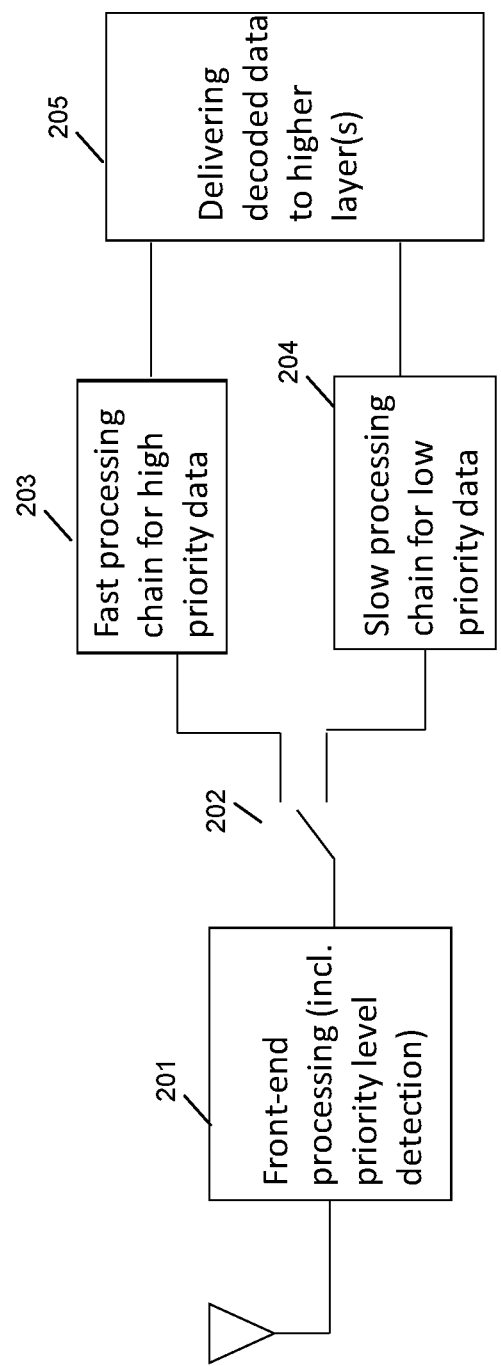
FIG. 2A is a diagram illustrating use of different processing chains based on a priority mismatch indication according to an example embodiment.

FIG. 2A is a diagram illustrating use of different processing chains based on a priority mismatch indication according to an example embodiment. According to an example embodiment, a different processing chain (e.g., either 203 or 204) may be used to perform decoding of the received information, depending on the priority mismatch indication (or depending on the priority of the information indicated by the priority mismatch indication). The priority of the UL granted resources is known by the network node (e.g., BS/gNB), and the priority mismatch indication received by the network node may indicate whether or not there is a mismatch between the priority level of the transmitted information and the priority level of the UL granted resources. Thus, the priority mismatch indication may also indicate to the network node the priority level of the transmitted information. Referring to the example in FIG. 2A, a front end processing block 201 performs front end processing on the received PUSCH channel, including detecting the priority mismatch indication, and thus, detecting the priority level of the received information. At processing chain selector 202, depending on the priority level of the received information (depending on whether or not the priority mismatch indication indicates a mismatch or not in priority level for the received information), the network node will select either a fast processing chain 203 (e.g., which may provide or allocate more processing and/or memory resources, a higher priority for decoding or processing, or a first scheme for decoding or processing, and/or other faster processing of the received channel, etc.) for high priority data, or a slow processing chain 204 (e.g., which may provide or allocate less processing and/or memory resources, a lower priority for decoding or processing, or a second scheme for decoding or processing, and/or other slower processing of the received channel, etc., as compared to fast processing chain 203) for low priority data. At 205, the processed (e.g., decoded) data is then input or delivered to higher software layers at the network node for further processing.

In an example embodiment, a processing chain may include different receive processing parameters or priorities, which may provide generally a faster or higher priority receive processing, or a generally slower or lower priority processing at the receiving node. For example, a processing chain (e.g., which may include baseband processing configurations, parameters, etc.) may include, for example, detection of DMRS (detection of demodulation reference signal), performing channel estimation, the decoding process (decoding of received information or data), Hybrid automatic repeat request (HARD) combining in case with retransmission, delivering the decoded data to upper layers. Processing chain may also include scheduling data for retransmission (in case of decoding error) and generating and transmitting to UE a retransmission grant (including parameters for retransmission) in case decoding error.

According to an example embodiment, multiplexing between channels with different priorities may provide benefits, such as for example, multiplexing high priority HARQ-ACK (hybrid ARQ Acknowledgement or negative Acknowledgement with respect to a downlink transmission) with low priority PUSCH to avoid unnecessary retransmission of low priority PUSCH (due to dropping of low priority PUSCH) which usually occupies a large block of resources. Multiplexing high priority HARQ-ACK with low priority PUSCH is feasible as well by properly selected resource for high priority HARQ-ACK transmission to guarantee the required latency and reliability requirements. These are some illustrative examples of intra-UE multiplexing of channels with different priorities. In some cases, control information may be transmitted via (or multiplexed) onto PUSCH (or other channel) resources, where the control information may include uplink control information (UCI), such as, e.g., one or more of HARQ-ACK/SR (scheduling request)/CSI (channel state information) measurement report, which may, be multiplexed with other information (e.g., such as data) via the PUSCH channel.

However, if the network node (e.g., BS or gNB) is uncertain whether the information (e.g., UCI, such as a SR) is provided or multiplexed onto the PUSCH resources, then the network node or gNB may perform multiple detections, including a first detection of the received information under an assumption or hypothesis that the information (e.g., SR) is present, and a second detection of the received information based on an assumption or hypothesis that the UCI or SR is not present or is not multiplexed onto the PUSCH resources. This may be referred to as the multiple detection hypothesis problem at gNB, as discussed above. Therefore, considering the intra-UE multiplexing operation between channels with different priority, one potential problem is the priority difference between the original grant and the multiplexed channel. Taking multiplexing PUSCH with PUCCH (control information, such as SR) as one example, a potential problem could arise in the scenario where a high priority control channel is multiplexed with low priority PUSCH.

Figure 2B:
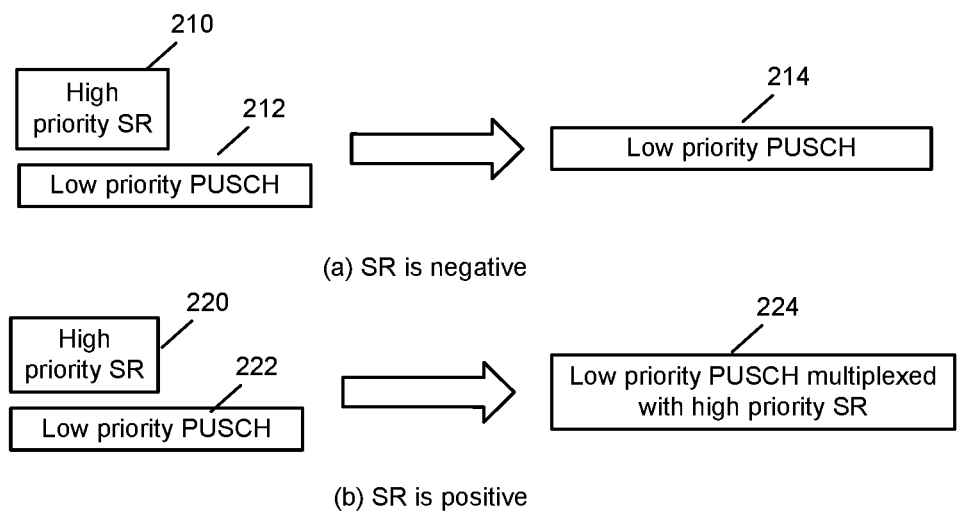
FIG. 2B is a diagram illustrating a multiplexing of high priority scheduling request onto a low priority physical uplink shared channel (PUSCH) channel according to an example embodiment.

FIG. 2B is a diagram illustrating a multiplexing of high priority scheduling request onto a low priority physical uplink shared channel (PUSCH) channel according to an example embodiment. As shown in FIG. 2B, in case a) the SR (scheduling request) 210 is a negative SR (SR not triggered or transmitted by UE), and only low priority PUSCH (low priority data) 212 is transmitted over PUSCH low priority granted resource, and is received at 214 by gNB, while in case b) a high priority positive SR 220 (SR is triggered at UE and transmitted to gNB) is multiplexed with low priority PUSCH 222 (e.g., high priority SR is multiplexed with low priority data and transmitted via low priority PUSCH granted resources), and arrives at 224 at gNB with low priority PUSCH data with a high priority SR. However, such multiplexing operation (SR being multiplexed onto PUSCH) is not known by the gNB (due to the unpredictability of positive SR arrival time), thus the gNB may need to try with different hypothesis in order to detect whether high priority positive SR is present or not (e.g., detect the received information based on the assumption that SR is provided, and in parallel, also detect the received information based on the assumption that SR is not provided). To be more specific, due to the unpredictability of SR, as shown in FIG. 2B, from gNB detection point of view, gNB may process with two different assumptions: (1) assuming no SR is multiplexed, that is to say, trying to decode with the assumption that all PUSCH resource is used for PUSCH transmission; and (2) assuming high priority SR is multiplexed with low priority PUSCH and they may be separately coded (to achieve better SR reliability), gNB will carry out the decoding process separately for SR and PUSCH (e.g., since these may be separately coded). In addition, the ambiguity of the detection problem may also be presented if low priority SR is allowed to be multiplexed with high priority PUSCH.

A similar problem may occur if a high priority MAC PDU (media access control protocol data unit, that includes data) is allowed to be mapped to (or transmitted via) a low priority grant. In this case, there is a mismatch between the grant priority (or priority level of the granted resources) known at gNB and the MAC PDU priority level. It may be helpful if such information can be informed or provided to gNB as early as possible especially considering the possible implementation where the high priority data and low priority data may be put on different processing chains (different processing resources) at the gNB, for example.

Another scenario where the above issue may occur is in case CG PUSCH overlapping with a HARQ-ACK and where multiplexing of these two channels within the same UE is allowed by configuration. Specifically, due to UE processing timeline, in some cases the UE may not be able to multiplex HARQ-ACK on CG PUSCH. Since the gNB is not aware of whether multiplexing has occurred, in addition to try detecting HARQ-ACK only (since the gNB is typically not aware whether the UE is transmitting CG data), the gNB may typically also need to try detecting PUSCH only and PUSCH multiplexing with HARQ-ACK (thus, causing a duplication of processing resources at the network node or gNB).

In order to facilitate gNB to handle the PUSCH in a more efficient way, it may be beneficial to let gNB know (or provide a notification to the gNB) together with the PUSCH, whether there is multiplexed UCI with a different priority level or not, for example in case high-priority control channel multiplexed with low-priority grant (or low priority level granted resources) or mapping MAC PDUs (transmitting or multiplexing data) from logical channels classified as high priority level in MAC to low priority grant/low priority level granted resources.

Thus, example embodiments may provide an efficient support of a dynamic indication (e.g., priority mismatch indication) of the presence of the multiplexed UCI (or other information) with a different priority level as compared to the priority level indicated in UL grant for granted resources (in case with dynamic grant) or configured in RRC signaling (in case with configured grant), for example. In a case with a low priority level data mapping (or being transmitted) via a high priority level grant (or high priority level granted resources), (e.g., in case with CG for high priority traffic, if no data coming for high priority CG, the data from the logical channels corresponding to low priority is mapped on the high priority CG resource), such a priority mismatch indication provided to the gNB may assist the gNB to determine appropriate processing and/or processing configuration for the information, e.g., such as to allocate proper processing power and corresponding retransmission schemes. In case that the low priority grant is used to carry high priority channel (e.g., due to multiplexing high priority control information onto low priority granted resources) which is more critical, such indication can help the gNB to process the data/control much faster, and for example, allocate more processing resources for the processing of the information, and/or allocate more resources for a (e.g., more) reliable retransmission if needed.

Thus, in an example embodiment, the UE may perform intra-UE multiplexing of information with a dynamic indication (e.g., priority mismatch indication) to the network node (gNB) about the priority mismatch between the UL grant (granted resources) and the multiplexed channel(s) (control information or data). And in case of SR transmission, the UE may use a different DMRS (demodulation reference signal) sequences and/or different orthogonal cover codes for a DMRS signal, or may transmit a DMRS signal via different DMRS symbols/resources and/or antenna port(s), to provide the priority mismatch indication to the gNB, e.g., which may include an indication that conveys or provides the SR (1 bit to indicate a positive SR). A positive SR refers to a SR that is transmitted or indicated by the UE, where the UE is requesting resources, while a negative SR may refer to a situation where no SR is triggered at the UE (thus, a situation where the UE is not requesting the gNB to schedule UL resources).

Different Alternatives:

The indication (e.g., priority mismatch indication) may be provided by the UE to the network node or gNB/BS as one or more of the following options: 1) demodulation reference signal (DMRS)-related information; 2) uplink control information; and/or a media access control (MAC) control element.

Option 1: DMRS-Related Information:

As noted, as option 1), the priority mismatch indication may be provided via DMRS-related information, which may include either a) different DMRS sequences, b) different orthogonal cover codes (OCCs) to be used for transmission of a (same) DMRS sequence, c) different symbols or resources and/or d) different antenna port(s) that may be used to transmit a DMRS sequence.

Thus, in example a), multiple DMRS sequences may be allocated to a UE, where a first sequence may indicate a match of priority levels, and a second sequence may indicate a priority mismatch. For example, the DMRS sequences may include a first DMRS sequence indicating that the priority level of the information matches the priority level of the uplink grant; and/or a second DMRS sequence indicating that the priority level of the information does not match the priority level of the uplink grant. For example, one DMRS sequence may be configured as a default sequence which is used in case there is no need to change the processing behavior, i.e., no priority mismatch independent with/without multiplexing. A different DMRS is configured in case the priority level of the information (e.g., data/control information) multiplexed on the granted resources is different from the priority level of the original grant or granted resources.

In example b), one DMRS sequence is allocated to a UE, but multiple OCCs (Orthogonal cover codes) may be used to indicate the presence of multiplexed channels/priority mismatch. For example, this example may include a DMRS sequence having a first orthogonal cover code indicating that the priority level of the information matches the priority level of the uplink grant; and/or the same DMRS sequence having a second orthogonal cover code indicating that the priority level of the information does not match the priority level of the uplink grant.

In example c), different symbols or resources, such as two different OFDM symbols or two sets of frequency resources within the same OFDM symbol, can be configured for DMRS sequence transmission. Then, depending whether there is multiplexed UCI/MAC PDUs and its priority level, the UE can determine to use one of the OFDM symbol/frequency resource to transmit the DMRS sequence, as a way to notify network node or gNB of a priority mismatch of multiplexed information. The benefit of this scheme is no reduction on DMRS multiplexing capacity.

In example d) different sets of antenna port(s) can be configured for DMRS sequence transmission, where a first set of antenna port(s) may indicate a match of priority levels, and a second set of antenna port(s) may indicate a priority mismatch. For example, the DMRS transmission over the first set of antenna port(s) indicating that the priority level of the information matches the priority level of the uplink grant; and/or a transmission using the second set of antenna port(s) indicating that the priority level of the information does not match the priority level of the uplink grant. For example, one second set of antenna port(s) may be configured which is used in case there is a need to change the processing behavior, i.e., priority mismatch presence. The legacy set of antenna port(s) is used in case the priority level of the information (e.g., data/control information) multiplexed on the granted resources is the same from the priority level of the original grant or granted resources.

Then, depending whether there is multiplexed UCI/MAC PDUs and its priority level, the UE can determine to use one set of antenna ports to transmit the DMRS sequence, as a way to notify network node or gNB of a priority mismatch of multiplexed information. The benefit of this scheme is no reduction on DMRS multiplexing capacity.

In case with UL SR multiplexing, the DMRS may be used to indicate the presence of positive SR, for example DMRS #1 indicating negative SR and DMRS #2 indicating positive SR. That is to say, the UE uses different DMRS orthogonal codes or different DMRS symbols to directly convey the positive SR (1 bit to indicate positive SR) information. Alternatively, the UE uses different DMRS orthogonal codes or a different set of antenna port(s) to indicate whether high priority control information has been multiplexed within a PUSCH. For example, the resources may include, e.g., a first set of symbols or time-frequency resources for transmission of a DMRS sequence to indicate that the priority level of the information matches the priority level of the uplink grant or no positive SR triggered; and/or a second set of symbols or time-frequency resources for transmission of the DMRS sequence to indicate that the priority level of the information does not match the priority level of the uplink grant or positive SR is triggered and multiplexed. It is worth noting that allocating multiple DMRS sequences to one UE should not be a problem in case with dynamic grant since the DMRS sequences can be reused among different UEs within the same cell (their UL resource is different anyway). In case with configured grant especially in case multiple UEs sharing the same resource, allocating multiple DMRS sequences to the same UE would reduce the overall multiplexing capability.

Option 2:

For example, the UE may transmit UCI (uplink control information) carrying (or including) the priority mismatch indication together with UL data. With the explicit control information (for example one-bit indication), gNB may obtain or receive the priority mismatch indication, e.g., indicating a priority mismatch or not between the priority level of the multiplexed UCI and the priority level of the granted resources. In Option 2), a case where UCI is transmitted together PUSCH in a similar as for example NR-U, one example embodiment is to introduce a new field in the UCI which is sent together with UL data. This new field (e.g., a priority mismatch indication) may be used to indicate whether or not the priority level of the UCI or information (channel) transmitted in PUSCH is the same as the priority level of the UL grant/granted resources. In case the priority level of the multiplexed channel is different than the priority level of UL grant, UE may indicate such priority mismatch by setting a value of the priority mismatch indication field within the UCI, which is provided within the channel over the PUSCH channel. One simple example of the priority mismatch indication field within included UCI may be a one-bit indication, for example, a '0' for no priority change (i.e., no priority level mismatch) and a '1' for priority changed (i.e., a priority mismatch). In this case gNB may receive such priority change (priority mismatch indication) information based on the detected UCI.

Option 3:

MAC Control Element (MAC CE): For example, the UE may use a MAC CE (MAC control information) to convey the priority mismatch indication about the possible priority mismatch. For example, information may be transmitted via the PUSCH granted resources, and this information may have a different priority level than the UL grant or granted resources. The MAC CE may include a priority mismatch indication to indicate whether or not the information has a priority mismatch with the PUSCH granted resources. One potential problem with Option 3 is gNB only knows the priority mismatch only after decoding the PUSCH which is a clear disadvantage as compared to Option 1 and Option 2. Since in both Option 1 and Option 2, gNB will already know the priority mismatch between the multiplexed channel and the original grant before the starting PUSCH decoding process.

Therefore, various techniques are provided that may allow a UE to provide or communicate a priority mismatch indication, e.g., to indicate whether or not there is a mismatch of the priority level of the channel that is transmitted or multiplexed onto the PUSCH granted resources, as compared to the priority level of the UL grant or granted resources. From the gNB perspective, based on the received DMRS, or MAC CE, or UCI, or a combination thereof (which may convey the priority mismatch indication), the gNB may learn or determine whether there is a mismatch (or not) between the priority level of the multiplexed channel and the priority level of the UL grant or granted resources. For example, based on the priority mismatch indication, the network node (e.g., BS or gNB) may determine or adjust processing or a processing configuration for the network node's processing of the received information.

Figure 3:
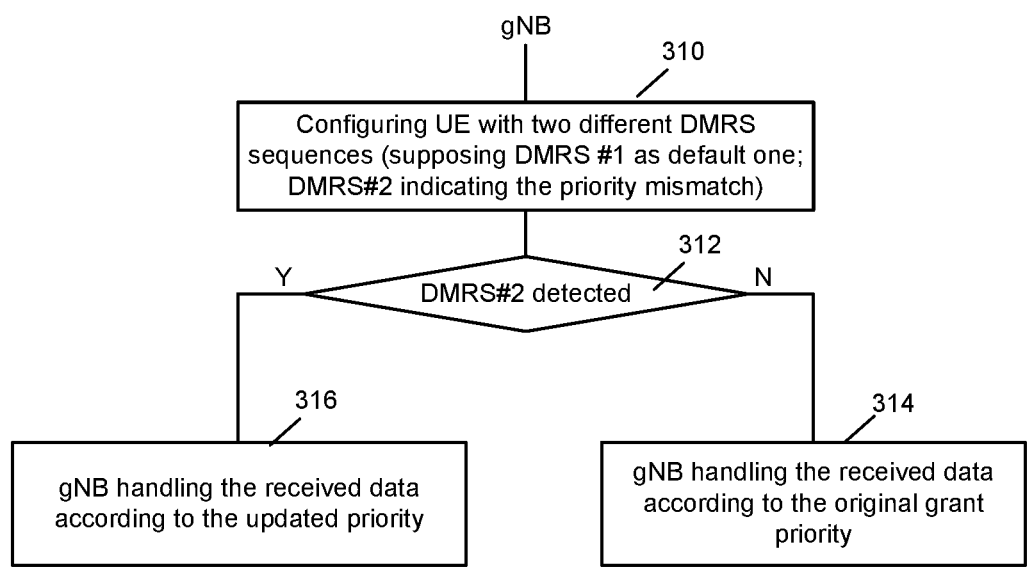
FIG. 3 is a flow chart illustrating operation of a network node (e.g., gNB) according to an example embodiment.
Figure 4:
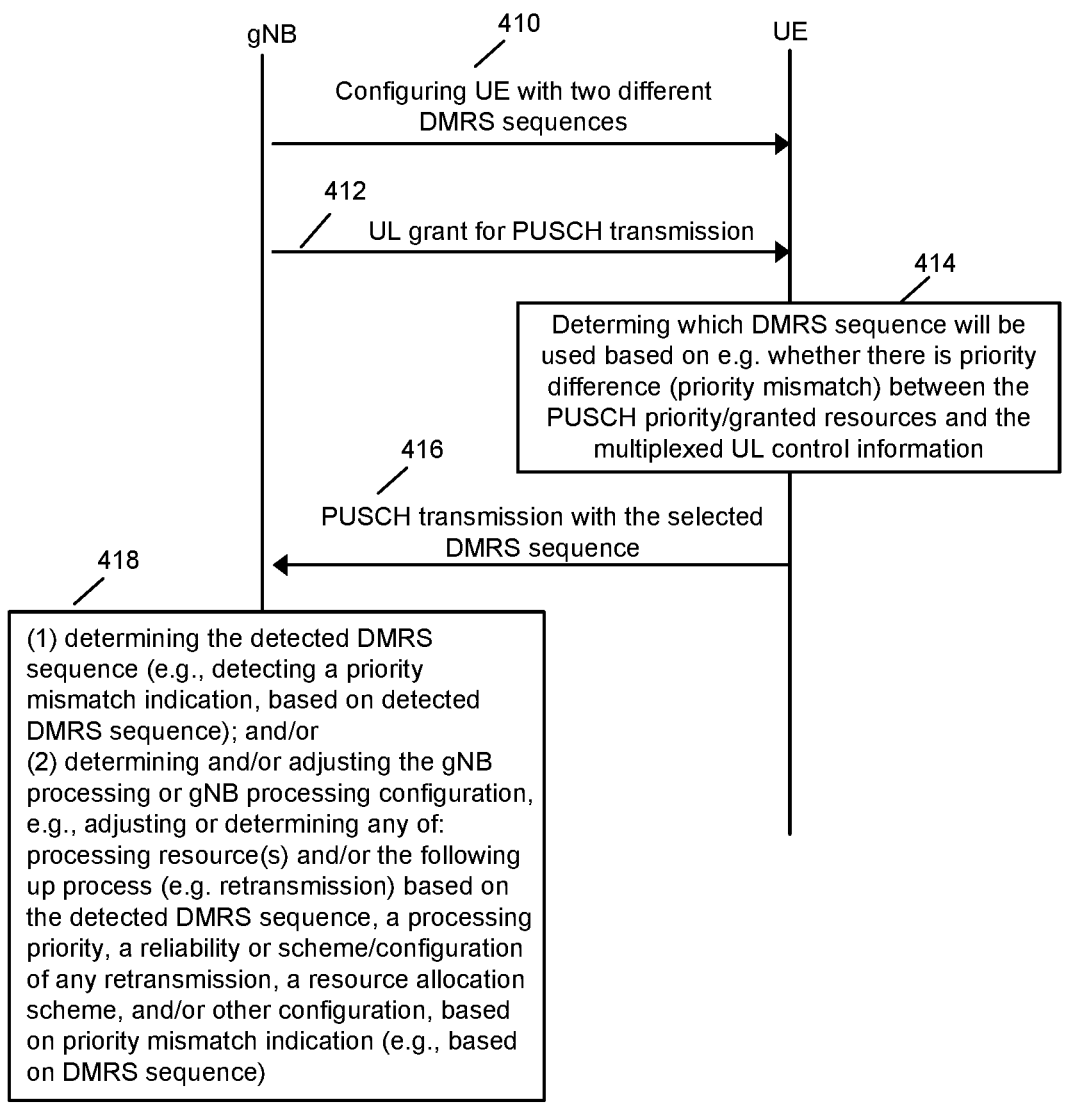
FIG. 4 is a diagram illustrating a signaling exchange between a UE and a network node or gNB according to an example embodiment.

FIGS. 3 and 4 are example flow charts, describing some illustrative examples, that are based on option 1a, which may use a priority mismatch indication implemented as one of a plurality of different DMRS sequences, to indicate whether or not the priority level of the transmitted or multiplexed information matches a priority level of the UL grant or the granted resources. Taking Option 1a as one example of indication, the following FIG. 3 illustrates one example of gNB behavior. Although not shown in separate figures, a similar behavior or operation may also be performed for the other options noted above including options 1b, 1c, 1d, 2 and 3, where different techniques may be used to provide or indicate a priority mismatch indication.

FIG. 3 is a flow chart illustrating operation of a network node (e.g., gNB) according to an example embodiment. The UE and gNB implement a priority mismatch indication based on option 1a) (different DMRS sequences). At 310, the gNB may configure the UE (e.g., send messages or other information indicating a configuration of the priority mismatch indication or priority mismatch indication values), e.g., to configure the UE with a configuration, such as to indicate the two DMRS sequences, including a DMRS sequence #1 as a default (no priority level mismatch), and a DMRS sequence #2 to indicate the transmitted or multiplexed channel has a priority mismatch. At 312, the gNB receives the priority mismatch indication in the form of a DMRS sequence. In this example, if DMRS sequence #1 is detected, then flow proceeds to 314, where the gNB may determine (or adjust or select) processing or determine a processing configuration based on the indication that the transmitted channel has the same priority level as the original grant priority level. On the other hand, if the DMRS sequence #2 is detected at 312, then flow proceeds to 316, where the gNB may determine (or adjust or select) processing or determine a processing configuration based on the indication that there is a priority mismatch between the priority level of the transmitted channel and the priority level of the UL grant or granted resources. Thus, in this manner, the priority of the UL grant/granted resources is known by the gNB. Therefore, the priority mismatch indication (indicating a priority mismatch or not, for the transmitted channel (e.g., control information or data)) also indicates to the gNB the priority level (e.g., low priority level or a high priority level) of the transmitted channel. The gNB may then determine or adjust its processing, resources, processing configuration, etc., accordingly.

FIG. 4 is a diagram illustrating a signaling exchange between a UE and a network node or gNB according to an example embodiment. UE previously received an UL grant (e.g., CG or DG) including the priority level of the UL grant. The UE also knows the priority level of the information (control information or data) to be transmitted or multiplexed over the PUSCH granted resources. Thus, the UE can determine whether or not there is a priority mismatch between the information and the granted resources. At 410, the gNB may configured the UE with the two different DMRS sequences, to be used/transmitted to indicate whether or not there is a priority mismatch for the transmitted channel or information.

At 412, the UE receives an UL grant from the gNB (e.g., a CG or a DG). At 414, the UE may determine which DMRS sequence will be used or transmitted (to provide the priority mismatch indication) based on whether or not there is a priority mismatch between the priority level of the information (e.g., UL control information) or channel to be transmitted, and the priority level of the PUSCH granted resources. At 416, the UE transmits the PUSCH, including any PUSCH data and the multiplexed UL control information via the PUSCH granted resources, along with the selected DMRS sequence (to provide the priority mismatch indication). DMRS may be part of PUSCH transmission, or may be transmitted with or in parallel with the transmission via the PUSCH granted resources.

At 418, the gNB receives the transmission via the PUSCH granted resources, e.g., the data and the multiplexed control information, as well as the priority mismatch indication that is provided as a specific DMRS sequence. The gNB detects the DMRS sequence to determine or detect the priority mismatch indication for this transmission. Thus, the gNB may determine the priority mismatch indication e.g., determine whether there is a priority mismatch or not, based on the detected DMRS sequence. The gNB may determine and/or adjust the gNB processing and/or gNB processing configuration, e.g., by adjusting or selecting or determining any of, e.g.: processing resources and/or a following up process or retransmission configuration, a reliability for a retransmission, a resource allocation scheme, a priority for the processing of the received information or channel, the decoding algorithm for PUSCH and/or multiplexed UCI, and or other determining or adjusting of processing or configuration, based on the priority mismatch indication (e.g., based on the received DMRS sequence), and/or by selecting a fast or slow processing chain (e.g., See FIG. 2A). Also, based on the priority mismatch indication, the multiple hypothesis decoding can be adjusted to use only one decoding hypothesis (or to use a fewer number of decoding hypotheses), e.g., since the gNB or receiving node learns or determines a format of the received information based on the priority mismatch indication.

Thus, for example, at gNB side, the gNB may perform: Configuring UE with two different DMRS sequences (DMRS #1 and DMRS #2 for example) and the corresponding rule: e.g., in this example, DMRS #1 is used if no priority difference between the multiplexed channel and the original grant, and DMRS #2 is used in case there is priority mismatch between the multiplexed control channel or the mapping MAC PDU with different priority compared to the original grant; Sending UL grant (either dynamic grant or configured grant) to UE for PUSCH transmission; DMRS detection for example with the correlator receiver and identifying which DMRS is received; Based on detected DMRS sequences, gNB learns whether the priority level of the carried UCI or MAC PDU is with the same priority level as the priority level indicated in the UL grant/granted resources, or not. In case the priority level is different (a priority mismatch exists), gNB may select, or adjust, e.g., the corresponding processing power (e.g., in case the high priority and low priority channels are handled with different processing chains) and also schemes for retransmission, processing prioritization, and/or other processing parameter or configuration.

Also, for example, at UE side, the UE may perform the following: Receiving the configuration about DMRS settings and the rule of DMRS sequence selection; Receiving UL grant; Before sending PUSCH with the grant, checking whether the priority level of the multiplexed UCI/MAC PDU is different from the priority level of UL grant or granted resources of UL grant; Determine whether the PUSCH has multiplexed with UCI having a priority level that is same as or different from priority level of the UL grant (or granted resources); Determine whether the PUSCH is carrying MAC PDU(s)/MAC CE(s) with different priority level as compared to priority level of UL grant/granted resources; For this step, MAC layer may inform PHY layer of UE about the priority mismatch since PHY may not be aware of the priority level of MAC PDU and/or MAC CE, for example; Determining the suitable DMRS sequence based on whether the priority of the multiplexed UCI/MAC PDU matches with the priority of the UL grant or not; For example, DMRS #1 is selected in case no change of priority (no priority mismatch), otherwise DMRS #2 is selected.

In an example, with PUSCH and multiplexed SR, the DMRS #2 can be used as implicit positive SR as well. In this case, in case SR is negative, DMRS #1 is selected and in case SR is positive, DMRS #2 is selected. gNB can easily learn whether the SR is positive or negative based on the detection outcome of DMRS. The selected DMRS sequence may be sent or transmitted with PUSCH data (to provide the priority mismatch indication for the information or UCI that is transmitted or multiplexed via PUSCH).

With this simple method, gNB may learn or determine whether the priority level of the multiplexed UCI/MAC PDU is the same as (or different from) the grant priority (or priority level of granted resources), and determine appropriate processing or follow-up settings or configuration. As discussed above, in case with SR transmission, gNB may learn (or detect or determine) whether the SR is positive (occurrence of a scheduling request from the UE) or not depending on the detected DMRS for example.

For the case where high priority HARQ-ACK multiplexing with low priority PUSCH, after receiving the priority change indication, gNB can determine the resource occupied by the high priority HARQ-ACK in the same way as in Rel-15 unless a new resource mapping will be introduced in the coming releases. Similar approach can be used for high priority SR detection as well unless positive SR information is carried via DMRS. For the case of mapping high priority MAC PDU to low priority grant, one simple example approach is only high priority MAC PDU is allowed to be sent on the resource. Then after gNB receiving the priority change indication, gNB will map the received PUSCH to high priority processing chain and also in case retransmission is needed, robust MCS can be selected to guarantee the required reliability.

Some Example Advantages

An example advantage may include that the solution can solve the problem in an efficient way. One of the major benefits is the great potential to reduce gNB processing complexity by avoiding multiple hypotheses (e.g., multiple LDPC decoding processes), and/or to allow the gNB to scale, adjust or determine processing resources and/or a processing configuration that may be suitable for or based on the priority level of the channel (and thus, e.g., adjustments or changes to processing resources or prioritization and/or processing configuration may be performed by gNB if there is a priority mismatch). For the case of carrying SR information via DMRS, it is quite simple, and no extra resource is needed for SR transmission in case positive SR is overlapping with low priority PUSCH, for example. From gNB detection point of view, it is quite simple as well.

Figure 5:
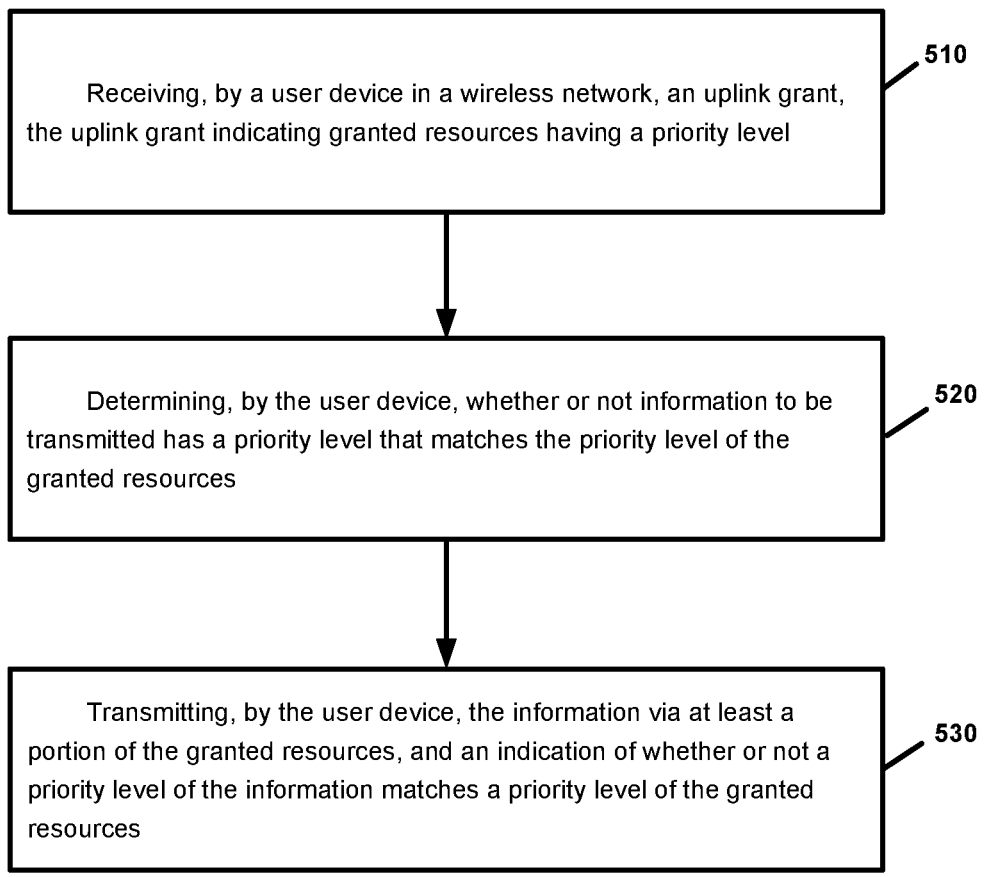
FIG. 5 is a flow chart illustrating operation of a user device according to an example embodiment.

Example 1. FIG. 5 is a flow chart illustrating operation of a user device according to an example embodiment. Operation 510 includes receiving, by a user device in a wireless network, an uplink grant, the uplink grant indicating granted resources having a priority level. Operation 520 includes determining, by the user device, whether or not information to be transmitted has a priority level that matches the priority level of the granted resources. And, operation 530 includes transmitting, by the user device, the information via at least a portion of the granted resources, and an indication of whether or not a priority level of the information matches a priority level of the granted resources.

Example 2. The method of Example 1, wherein the indication comprises a priority mismatch indication that indicates whether or not the priority level of the information matches, or is the same as, the priority level of the granted resources.

Example 3. The method of any of Examples 1-2, further comprising: determining, by the user device, two different values of the indication, including: a first value of the indication to indicate that the priority level of the information matches the priority level of the granted resources; and a second value of the indication to indicate that the priority level of the information does not match the priority level of the granted resources.

Example 4. The method of any of Examples 1-3, wherein the information comprises at least one of the following: uplink control information (UCI), including at least one of a scheduling request (SR), a channel state information (CSI) report, and/or a hybrid ARQ (HARQ) acknowledgement or negative acknowledgement (HARQ ACK/NACK); data; media access control protocol data units (MAC PDUs) that include data; MAC control element (MAC CE) including control information.

Example 5. The method of any of Examples 1-4, wherein the uplink grant comprises at least one of: a dynamic grant; or a configured grant.

Example 6. The method of any of Examples 1-5, wherein the transmitting of information and the indication is performed via granted resources of a physical uplink shared channel (PUSCH).

Example 7. The method of any of Examples 1-6: wherein the granted resources comprise granted resources having a first priority level; and wherein the information comprises either uplink control information or data, having a second priority level that is different from the first priority level, multiplexed onto the granted resources, and wherein the indication indicates that the priority level of the information does not match the priority level of the uplink grant.

Example 8. The method of any of Examples 1-7: wherein the uplink grant has a low priority level; and wherein the information comprises uplink control information, having a high priority level, multiplexed onto the granted resources with data having a low priority level, and wherein the indication indicates that a priority level of the uplink control information does not match the priority level of the uplink grant.

Example 9. The method of any of Examples 1-8, wherein the uplink grant has a low priority level, and the information comprises a scheduling request having a high priority, and wherein the priority mismatch indication indicates that the priority level of the information does not match a priority level of the uplink grant, and wherein the indication indicates at least one of: a positive scheduling request or a negative scheduling request.

Example 10. The method of any of Examples 1-9, wherein the indication comprises a priority mismatch indication that includes at least one of: demodulation reference signal (DMRS)-related information; uplink control information; or a media access control (MAC) control element.

Example 11. The method of Example 10, wherein the demodulation reference signal (DMRS)-related information comprises at least one of: a first DMRS sequence indicating that the priority level of the information matches the priority level of the uplink grant; or a second DMRS sequence indicating that the priority level of the information does not match the priority level of the uplink grant.

Example 12. The method of Example 10, wherein the demodulation reference signal (DMRS)-related information comprises at least one of: a DMRS sequence having a first orthogonal cover code indicating that the priority level of the information matches the priority level of the uplink grant; or the DMRS sequence having a second orthogonal cover code indicating that the priority level of the information does not match the priority level of the uplink grant.

Example 13. The method of Example 10, wherein the demodulation reference signal (DMRS)-related information comprises at least one of: a first set of symbols or time-frequency resources for transmission of a DMRS sequence to indicate that the priority level of the information matches the priority level of the uplink grant; or a second set of symbols or time-frequency resources for transmission of the DMRS sequence to indicate that the priority level of the information does not match the priority level of the uplink grant.

Example 14. The method of Example 10, wherein the demodulation reference signal (DMRS)-related information comprises at least one of: a first set of antenna port(s) for transmission of a DMRS sequence to indicate that the priority level of the information matches the priority level of the uplink grant; or a second set of antenna port(s) for transmission of the DMRS sequence to indicate that the priority level of the information does not match the priority level of the uplink grant.

Example 15. The method of Example 1, wherein the information comprises a first information, wherein the transmitting comprises: transmitting, by the user device, the first information, multiplexed with a second information, via the granted resources.

Example 16. The method of Example 15, wherein the second information has a priority level that matches the priority level of the granted resources, and wherein the first information has a priority level that may or may not match the priority level of the granted resources.

Example 17. An apparatus comprising means for performing the method of any of Examples 1-16.

Example 18. A computer program comprising instructions which, when the program is executed by a computer, cause the computer to carry out the method of any of Examples 1-16.

Example 19. An apparatus comprising: at least one processor; and at least one memory including computer program code; the at least one memory and the computer program code configured to, with the at least one processor, cause the apparatus at least to perform the method of any of Examples 1-16.

Figure 6:
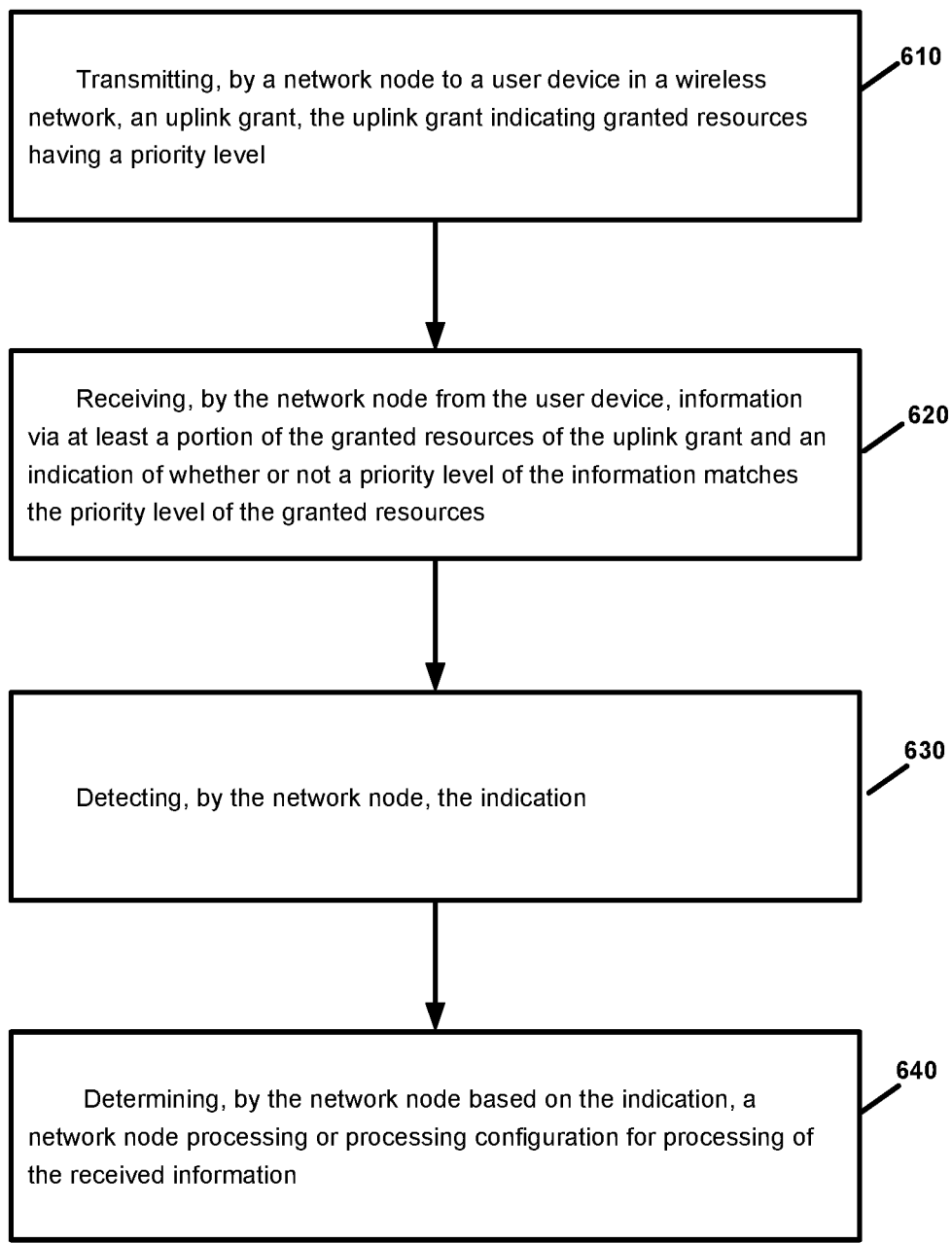
FIG. 6 is a flow chart illustrating operation of a network node according to an example embodiment.

Example 20. FIG. 6 is a flow chart illustrating operation of a network node according to an example embodiment. Operation 610 includes transmitting, by a network node to a user device in a wireless network, an uplink grant, the uplink grant indicating granted resources having a priority level. Operation 620 includes receiving, by the network node from the user device, information via at least a portion of the granted resources of the uplink grant and an indication of whether or not a priority level of the information matches the priority level of the granted resources. Operation 630 includes detecting, by the network node, the indication. And, operation 640 includes determining, by the network node based on the indication, a network node processing or processing configuration for processing of the received information.

Example 21. The method of Example 20, wherein the determining, by the network node based on the indication, a network node processing or processing configuration for processing of the received information comprises the network node performing at least one of: selecting, by the network node, an amount or type of processor and/or memory resources to be used or applied to process the information; selecting by the network node, a processing configuration to processing the information; selecting, by the network node, a priority or prioritization that is applied by the network node to process the information; selecting, by the network node, a different scheme, including a different reliability, for any retransmission based on the information; selecting, by the network node, a different resource allocation scheme, for a first transmission based on the information; or selecting, by the network node, a different resource allocation scheme, considering, or based on, a difference between a priority level of a scheduling request (SR) and a priority level of the granted resources.

Example 22. The method of any of Examples 20-21, wherein the detecting the indication comprises detecting that the indication is one of a plurality of values including: a first value of the indication that indicates that the priority level of the information matches the priority level of the granted resources; or a second value of the indication that indicates that the priority level of the information does not match the priority level of the granted resources.

Example 23. The method of any of Examples 20-22, wherein the indication comprises a priority mismatch indication, further comprising: providing, by the network node to the user device, a configuration of the priority mismatch indication, including configuring the user device with a first value of the priority mismatch indication that indicates that the priority level of the information matches the priority level of the granted resources, and a second value of the priority mismatch indication that indicates that the priority level of the information does not match the priority level of the granted resources.

Example 24. The method of any of Examples 20-23, wherein the information comprises at least one of the following: uplink control information (UCI), including at least one of a scheduling request (SR), a channel state information (CSI) report, and/or a hybrid ARQ (HARQ) acknowledgement or negative acknowledgement (HARQ ACK/NACK); data; media access control protocol data units (MAC PDUs) that include data; MAC control element (MAC CE) including control information.

Example 25. The method of any of Examples 20-24, wherein the uplink grant comprises at least one of: a dynamic grant; or a configured grant.

Example 26. The method of any of Examples 20-25, wherein the receiving of information and the indication is performed via granted resources of a physical uplink shared channel (PUSCH).

Example 27. The method of any of Examples 20-26: wherein the granted resources comprise granted resources having a first priority level; and wherein the information comprises either uplink control information or data, having a second priority level that is different from the first priority level, multiplexed onto the granted resources, and wherein the indication indicates that the priority level of the information does not match the priority level of the uplink grant.

Example 28. The method of any of Examples 20-27: wherein the granted resources have a low priority level; and wherein the information comprises uplink control information, having a high priority level, multiplexed onto the granted resources with data having a low priority level, and wherein the indication indicates that a priority level of the uplink control information does not match the priority level of the uplink grant.

Example 29. The method of any of Examples 20-28, wherein the uplink grant has a low priority level, and the information comprises a scheduling request having a high priority, and wherein the priority mismatch indication indicates that the priority level of the information does not match a priority level of the uplink grant, and wherein the priority mismatch indication also indicates a presence of the scheduling request being transmitted via the granted resources of the uplink grant.

Example 30. The method of any of Examples 20-29, wherein the priority mismatch indication comprises at least one of: demodulation reference signal (DMRS)-related information; uplink control information; or a media access control (MAC) control element.

Example 31. The method of Example 30, wherein the demodulation reference signal (DMRS)-related information comprises at least one of: a first DMRS sequence indicating that the priority level of the information matches the priority level of the uplink grant; or a second DMRS sequence indicating that the priority level of the information does not match the priority level of the uplink grant.

Example 32. The method of Example 30, wherein the demodulation reference signal (DMRS)-related information comprises at least one of: a DMRS sequence having a first orthogonal cover code indicating that the priority level of the information matches the priority level of the uplink grant; or the DMRS sequence having a second orthogonal cover code indicating that the priority level of the information does not match the priority level of the uplink grant.

Example 33. The method of Example 30, wherein the demodulation reference signal (DMRS)-related information comprises at least one of: a first set of symbols or time-frequency resources for reception of a DMRS sequence to indicate that the priority level of the information matches the priority level of the uplink grant; or a second set of symbols or time-frequency resources for reception of the DMRS sequence to indicate that the priority level of the information does not match the priority level of the uplink grant.

Example 34. The method of Example 30, wherein the demodulation reference signal (DMRS)-related information comprises at least one of: a first set of antenna port(s) used at the transmitter for transmission of a DMRS sequence to indicate that the priority level of the information matches the priority level of the uplink grant; or a second set of antenna port(s) used at the transmitter for transmission of the DMRS sequence to indicate that the priority level of the information does not match the priority level of the uplink grant.

Example 35. An apparatus comprising means for performing the method of any of Examples 20-34.

Example 36. A computer program comprising instructions which, when the program is executed by a computer, cause the computer to carry out the method of any of Examples 20-34.

Example 37. An apparatus comprising: at least one processor; and at least one memory including computer program code; the at least one memory and the computer program code configured to, with the at least one processor, cause the apparatus at least to perform the method of any of Examples 20-34.

Example 38. An apparatus comprising: at least one processor; and at least one memory including computer program code; the at least one memory and the computer program code configured to, with the at least one processor, cause the apparatus to: transmit, by a network node to a user device in a wireless network, an uplink grant, the uplink grant indicating granted resources having a priority level; receive, by the network node from the user device, information via at least a portion of the granted resources of the uplink grant and an indication of whether or not a priority level of the information matches the priority level of the granted resources; detect, by the network node, the indication; and adjust, by the network node based on the indication, processing of the received information performed by the network node.

Example 39. An apparatus comprising: at least one processor; and at least one memory including computer program code; the at least one memory and the computer program code configured to, with the at least one processor, cause the apparatus to: receive, by a user device in a wireless network, an uplink grant, the uplink grant indicating granted resources having a priority level; determine, by the user device, whether or not information to be transmitted has a priority level that matches the priority level of the granted resources; and transmit, by the user device, the information via at least a portion of the granted resources, and an indication of whether or not a priority level of the information matches a priority level of the granted resources.

Example 40. The apparatus of Example 39: wherein the indication comprises demodulation reference signal (DMRS)-related information; the apparatus being further configured to cause the apparatus to: receive, by the user device, a configuration of the DMRS-related information.

Example 41. The apparatus of any of Examples 39-40, wherein the indication comprises demodulation reference signal (DMRS)-related information; the apparatus being further configured to cause the apparatus to receive, by the user device, a configuration the DMRS-related information, including information identifying at least one of: one or more DMRS sequences indicating whether the priority level of the information matches the priority level of the uplink grant; one or more orthogonal cover codes (OCCs), to be used for transmission of a DMRS sequence, indicating whether the priority level of the information matches the priority level of the uplink grant; or one or more sets of symbols or time-frequency resources for transmitting a DMRS sequence indicating that whether the priority level of the information matches the priority level of the uplink grant; and/or a set of antenna port(s) used at a transmitter for transmission of at least one DMRS sequence.

Figure 7:
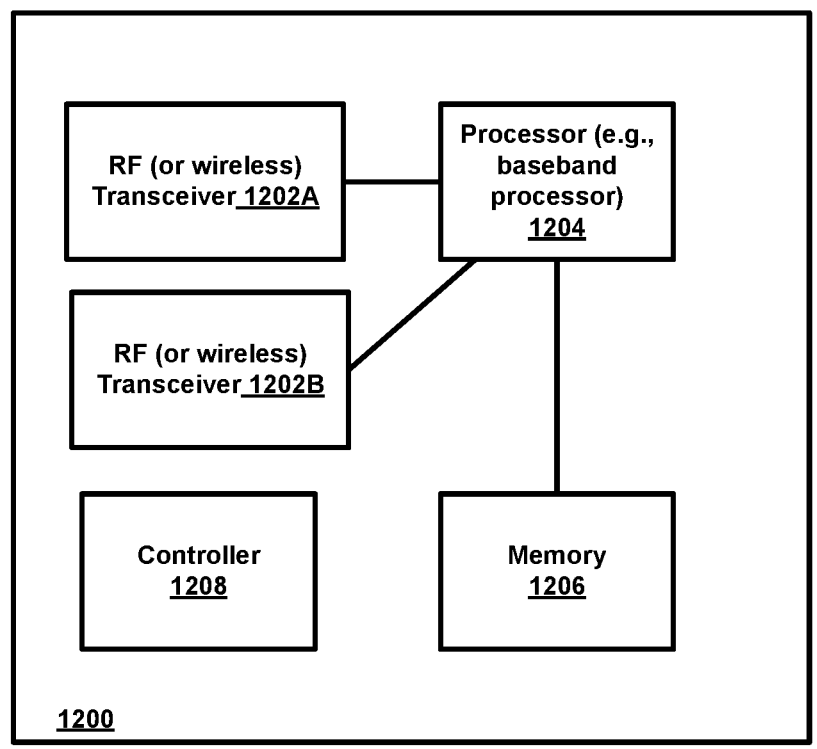
FIG. 7 is a block diagram of a wireless station, network node or wireless node (e.g., AP, BS, RAN node, UE or user device, or other wireless node or network node) according to an example embodiment.

FIG. 7 is a block diagram of a wireless station (e.g., AP, BS or user device/UE, or another network node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectric and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, by a user device in a wireless network, an uplink grant, the uplink grant indicating granted resources having a priority level;
determining, by the user device, whether or not information to be transmitted has a priority level that matches the priority level of the granted resources; and
transmitting, by the user device, the information via at least a portion of the granted resources, and an indication of whether or not a priority level of the information matches a priority level of the granted resources,
wherein the indication comprises a priority mismatch indication that includes at least one of:
demodulation reference signal (DMRS)-related information;
uplink control information; or
a media access control (MAC) control element, and
wherein the demodulation reference signal (DMRS)-related information comprises at least one of:
a first DMRS sequence indicating that the priority level of the information matches the priority level of the uplink grant; or
a second DMRS sequence indicating that the priority level of the information does not match the priority level of the uplink grant.

2. The method of claim 1, wherein the indication comprises a priority mismatch indication that indicates whether or not the priority level of the information matches, or is the same as, the priority level of the granted resources.

3. The method of claim 1, further comprising:
determining, by the user device, two different values of the indication, including:
a first value of the indication to indicate that the priority level of the information matches the priority level of the granted resources; and
a second value of the indication to indicate that the priority level of the information does not match the priority level of the granted resources.

4. The method of claim 1, wherein the information comprises at least one of the following:
uplink control information (UCI), including at least one of a scheduling request (SR), a channel state information (CSI) report, and/or a hybrid ARQ (HARQ) acknowledgement or negative acknowledgement (HARQ ACK/NACK);
data;
media access control protocol data units (MAC PDUs) that include data;
MAC control element (MAC CE) including control information.

5. The method of claim 1, wherein the uplink grant comprises at least one of:
a dynamic grant; or
a configured grant.

6. The method of claim 1, wherein the transmitting of information and the indication is performed via granted resources of a physical uplink shared channel (PUSCH).

7. The method of claim 1:
wherein the granted resources comprise granted resources having a first priority level; and
wherein the information comprises either uplink control information or data, having a second priority level that is different from the first priority level, multiplexed onto the granted resources, and wherein the indication indicates that the priority level of the information does not match the priority level of the uplink grant.

8. The method of claim 1:
wherein the uplink grant has a low priority level; and
wherein the information comprises uplink control information, having a high priority level, multiplexed onto the granted resources with data having a low priority level, and wherein the indication indicates that a priority level of the uplink control information does not match the priority level of the uplink grant.

9. The method of claim 1, wherein the uplink grant has a low priority level, and the information comprises a scheduling request having a high priority, and wherein the priority mismatch indication indicates that the priority level of the information does not match a priority level of the uplink grant, and wherein the indication indicates at least one of: a positive scheduling request or a negative scheduling request.

10. The method of claim 1, wherein the demodulation reference signal (DMRS)-related information comprises at least one of:
a DMRS sequence having a first orthogonal cover code indicating that the priority level of the information matches the priority level of the uplink grant; or
the DMRS sequence having a second orthogonal cover code indicating that the priority level of the information does not match the priority level of the uplink grant.

11. The method of claim 1, wherein the demodulation reference signal (DMRS)-related information comprises at least one of:
a first set of symbols or time-frequency resources for transmission of a DMRS sequence to indicate that the priority level of the information matches the priority level of the uplink grant; or
a second set of symbols or time-frequency resources for transmission of the DMRS sequence to indicate that the priority level of the information does not match the priority level of the uplink grant.

12. The method of claim 1, wherein the demodulation reference signal (DMRS)-related information comprises at least one of:
a first set of antenna port(s) for transmission of a DMRS sequence to indicate that the priority level of the information matches the priority level of the uplink grant; or
a second set of antenna port(s) for transmission of the DMRS sequence to indicate that the priority level of the information does not match the priority level of the uplink grant.

13. The method of claim 1, wherein the information comprises a first information, wherein the transmitting comprises:
transmitting, by the user device, the first information, multiplexed with a second information, via the granted resources.

14. The method of claim 13, wherein the second information has a priority level that matches the priority level of the granted resources, and wherein the first information has a priority level that may or may not match the priority level of the granted resources.

15. A method comprising:
transmitting, by a network node to a user device in a wireless network, an uplink grant, the uplink grant indicating granted resources having a priority level;
receiving, by the network node from the user device, information via at least a portion of the granted resources of the uplink grant and an indication of whether or not a priority level of the information matches the priority level of the granted resources;
detecting, by the network node, the indication; and
determining, by the network node based on the indication, a network node processing or processing configuration for processing of the received information,
wherein the priority mismatch indication comprises at least one of:
demodulation reference signal (DMRS)-related information;
uplink control information; or
a media access control (MAC) control element, and
wherein the demodulation reference signal (DMRS)-related information comprises at least one of:
a first DMRS sequence indicating that the priority level of the information matches the priority level of the uplink grant; or
a second DMRS sequence indicating that the priority level of the information does not match the priority level of the uplink grant.

16. The method of claim 15, wherein the determining, by the network node based on the indication, a network node processing or processing configuration for processing of the received information comprises the network node performing at least one of: selecting, by the network node, an amount or type of processor and/or memory resources to be used or applied to process the information;
selecting by the network node, a processing configuration to processing the information; selecting, by the network node, a priority or prioritization that is applied by the network node to process the information; and/or
selecting, by the network node, a different scheme, including a different reliability, for any retransmission based on the information; or
selecting, by the network node, a different resource allocation scheme, for a first transmission based on the information;
selecting, by the network node, a different resource allocation scheme, considering, or based on, a difference between a priority level of a scheduling request (SR) and a priority level of the granted resources.

17. The method of claim 15, wherein the detecting the indication comprises detecting that the indication is one of a plurality of values including:
   a first value of the indication that indicates that the priority level of the information matches the priority level of the granted resources; or
   a second value of the indication that indicates that the priority level of the information does not match the priority level of the granted resources.

18. The method of claim 15, wherein the indication comprises a priority mismatch indication, further comprising:
   providing, by the network node to the user device, a configuration of the priority mismatch indication, including configuring the user device with a first value of the priority mismatch indication that indicates that the priority level of the information matches the priority level of the granted resources, and a second value of the priority mismatch indication that indicates that the priority level of the information does not match the priority level of the granted resources.

19. The method of claim 15, wherein the information comprises at least one of the following:
   uplink control information (UCI), including at least one of a scheduling request (SR), a channel state information (CSI) report, and/or a hybrid ARQ (HARQ) acknowledgement or negative acknowledgement (HARQ ACK/NACK);
   data;
   media access control protocol data units (MAC PDUs) that include data;
   MAC control element (MAC CE) including control information.

20. The method of claim 15, wherein the uplink grant comprises at least one of:
   a dynamic grant; or
   a configured grant.

21. The method of claim 15, wherein the receiving of information and the indication is performed via granted resources of a physical uplink shared channel (PUSCH).

22. The method of claim 15:
   wherein the granted resources comprise granted resources having a first priority level; and
   wherein the information comprises either uplink control information or data, having a second priority level that is different from the first priority level, multiplexed onto the granted resources, and wherein the indication indicates that the priority level of the information does not match the priority level of the uplink grant.

23. The method of claim 15:
   wherein the granted resources have a low priority level; and
   wherein the information comprises uplink control information, having a high priority level, multiplexed onto the granted resources with data having a low priority level, and wherein the indication indicates that a priority level of the uplink control information does not match the priority level of the uplink grant.

24. The method of claim 15, wherein the uplink grant has a low priority level, and the information comprises a scheduling request having a high priority, and wherein the priority mismatch indication indicates that the priority level of the information does not match a priority level of the uplink grant, and wherein the priority mismatch indication also indicates a presence of the scheduling request being transmitted via the granted resources of the uplink grant.

25. The method of claim 15, wherein the demodulation reference signal (DMRS)-related information comprises at least one of:
   a DMRS sequence having a first orthogonal cover code indicating that the priority level of the information matches the priority level of the uplink grant; or
   the DMRS sequence having a second orthogonal cover code indicating that the priority level of the information does not match the priority level of the uplink grant.

26. The method of claim 15, wherein the demodulation reference signal (DMRS)-related information comprises at least one of:
   a first set of symbols or time-frequency resources for reception of a DMRS sequence to indicate that the priority level of the information matches the priority level of the uplink grant; or
   a second set of symbols or time-frequency resources for reception of the DMRS sequence to indicate that the priority level of the information does not match the priority level of the uplink grant.

27. The method of claim 15, wherein the demodulation reference signal (DMRS)-related information comprises at least one of:
   a first set of antenna port(s) used at the transmitter for transmission of a DMRS sequence to indicate that the priority level of the information matches the priority level of the uplink grant; or
   a second set of antenna port(s) used at the transmitter for transmission of the DMRS sequence to indicate that the priority level of the information does not match the priority level of the uplink grant.

28. An apparatus comprising:
   at least one processor; and
   at least one memory including computer program code;
   the at least one memory and the computer program code configured to, with the at least one processor, cause the apparatus to:
   receive, by a user device in a wireless network, an uplink grant, the uplink grant indicating granted resources having a priority level;
   determine, by the user device, whether or not information to be transmitted has a priority level that matches the priority level of the granted resources; and
   transmit, by the user device, the information via at least a portion of the granted resources, and an indication of whether or not a priority level of the information matches a priority level of the granted resources, and
   wherein the indication comprises demodulation reference signal (DMRS)-related information;
   the apparatus being further configured to cause the apparatus to receive, by the user device, a configuration the DMRS-related information, including information identifying at least one of:
   one or more DMRS sequences indicating whether the priority level of the information matches the priority level of the uplink grant;
   one or more orthogonal cover codes (OCCs), to be used for transmission of a DMRS sequence, indicating whether the priority level of the information matches the priority level of the uplink grant; or
   one or more sets of symbols or time-frequency resources for transmitting a DMRS sequence indicating that whether the priority level of the information matches the priority level of the uplink grant; and/or
   a set of antenna port(s) used at a transmitter for transmission of at least one DMRS sequence.

29. The apparatus of claim 28:
wherein the indication comprises demodulation reference signal (DMRS)-related information;
the apparatus being further configured to cause the apparatus to:
receive, by the user device, a configuration of the DMRS-related information.

* * * * *